(12) United States Patent
Fujii et al.

(10) Patent No.: US 7,614,971 B2
(45) Date of Patent: Nov. 10, 2009

(54) APPARATUS FOR FINE TUNING A BICYCLE DERAILLEUR POSITION

(75) Inventors: Kazuhiro Fujii, Kawachinagano (JP); Ryuichiro Takamoto, Sakai (JP); Tadashi Ichida, Ikoma (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 761 days.

(21) Appl. No.: 10/906,469

(22) Filed: Feb. 22, 2005

(65) Prior Publication Data

US 2005/0187051 A1   Aug. 25, 2005

(30) Foreign Application Priority Data

Feb. 24, 2004  (JP) .............................. 2004-047820

(51) Int. Cl.
*F16H 59/00*  (2006.01)
*G06F 7/00*   (2006.01)

(52) U.S. Cl. .......................... 474/70; 701/52; 74/336 R

(58) Field of Classification Search ................. 474/69, 474/70, 78, 80, 82; 74/501.5 R, 502.4, 502.6, 74/336 R; 701/51–55
See application file for complete search history.

(56) References Cited

U.S. PATENT DOCUMENTS

| | | | |
|---|---|---|---|
| 4,833,937 A | * | 5/1989 | Nagano ...................... 74/502.4 |
| 5,354,243 A | * | 10/1994 | Kriek ......................... 474/160 |
| 5,470,277 A | | 11/1995 | Romano |
| 5,480,356 A | * | 1/1996 | Campagnolo ................. 474/70 |
| 5,577,969 A | * | 11/1996 | Watarai ........................ 474/78 |
| 5,599,244 A | * | 2/1997 | Ethington ..................... 474/70 |
| 5,728,017 A | | 3/1998 | Bellio et al. |
| 6,740,003 B2 | | 5/2004 | Fukuda |
| 6,767,308 B2 | * | 7/2004 | Kitamura ....................... 477/7 |
| 6,931,958 B2 | * | 8/2005 | Takeda ......................... 701/52 |
| 7,013,751 B2 | * | 3/2006 | Hilsky et al. ................ 74/551.9 |
| 7,223,189 B2 | * | 5/2007 | Guderzo et al. ................ 474/70 |
| 2002/0128106 A1 | * | 9/2002 | Kitamura ....................... 475/2 |
| 2004/0035233 A1 | * | 2/2004 | Takeda ...................... 74/336 R |
| 2004/0142783 A1 | * | 7/2004 | Kamada et al. ............. 474/160 |

FOREIGN PATENT DOCUMENTS

| | | |
|---|---|---|
| EP | 647558 A1 | 4/1995 |
| EP | 1238903 A2 | 9/2002 |
| EP | 1314637 A1 | 5/2003 |
| EP | 1359088 A2 | 11/2003 |
| EP | 1375324 A2 | 1/2004 |
| JP | 5-254482 A | 10/1993 |
| JP | 3296923 B2 | 2/1995 |

* cited by examiner

*Primary Examiner*—Marcus Charles
(74) *Attorney, Agent, or Firm*—James A. Deland

(57) ABSTRACT

A derailleur control apparatus comprises a control unit that receives shift control signals. The control unit provides a first signal to operate the derailleur a first distance from a first sprocket to a second sprocket in response to a first shift control signal received while operating in a riding mode, and the control unit provides a second signal to operate the derailleur a second distance less than the first distance in response to a second shift control signal received while operating in the riding mode.

44 Claims, 16 Drawing Sheets

APPARATUS FOR FINE TUNING A BICYCLE DERAILLEUR POSITION

BACKGROUND OF THE INVENTION

The present invention is directed to bicycles and, more particularly, to an apparatus for fine tuning a bicycle derailleur position.

Bicycle transmissions that comprise front and rear derailleurs are well known. The front derailleur shifts a chain among a plurality of front sprockets that are coaxially mounted to the pedal crank shaft, and the rear derailleur shifts the chain among a plurality of rear sprockets that are coaxially mounted to the rear wheel. It is also known to use electric motors to operate the front and rear derailleurs, wherein operating a button or lever on a shift control device mounted to the bicycle handlebar controls the motors. Such a system is shown in Japanese Patent Application No. 2002-87371.

The chain is oriented in very extreme angles when it engages the innermost front sprocket in combination with the outermost rear sprocket and when it engages the outermost front sprocket in combination with the innermost rear sprocket. Depending upon the design of the bicycle frame, such extreme angles may cause the chain to rub against the front derailleur cage. Even when the front derailleur is initially installed in a proper position, the derailleur may subsequently move over time, thereby again causing the chain to rub against the derailleur cage in such situations. Such contact causes noise, greater pedaling resistance, and excessive wear on the derailleur cage.

SUMMARY OF THE INVENTION

The present invention is directed to various features of a derailleur control apparatus. In one embodiment, a derailleur control apparatus comprises a control unit that receives shift control signals. The control unit provides a first signal to operate the derailleur a first distance from a first sprocket to a second sprocket in response to a first shift control signal received while operating in a riding mode, and the control unit provides a second signal to operate the derailleur a second distance less than the first distance in response to a second shift control signal received while operating in the riding mode. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
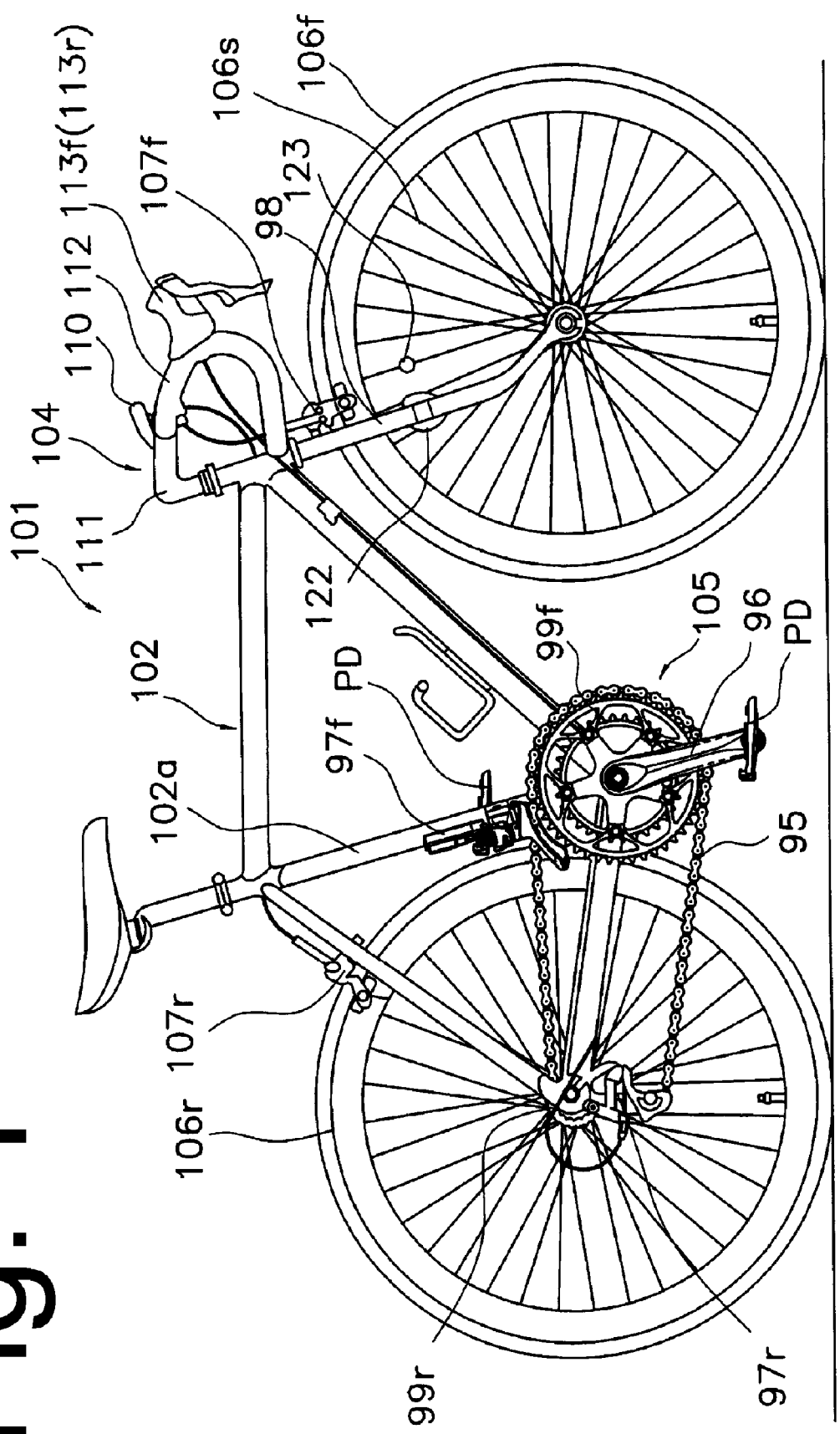
FIG. 1 is a side view of a particular embodiment of a bicycle.

FIG. 1 is a side view of a bicycle 101 that includes particular embodiments of electrically controlled components. Bicycle 101 is road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Figure 5:
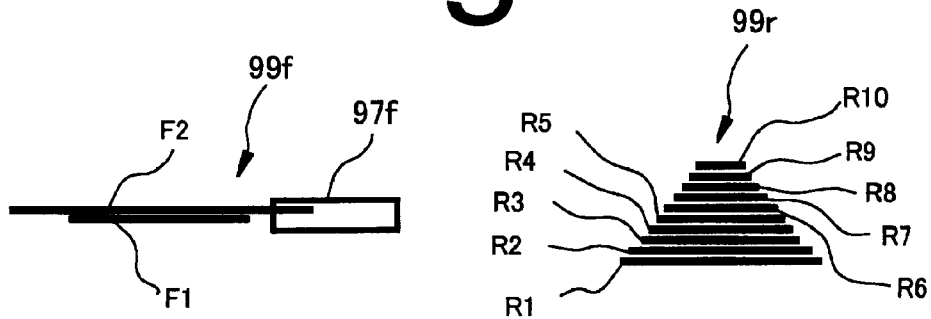
FIG. 5 is a schematic diagram of the front and rear sprocket assemblies.

Drive unit 105 comprises a chain 95, a front sprocket assembly 99f coaxially mounted with a crank 96 having pedals PD, an electrically controlled front derailleur 97f attached to a seat tube 102a of frame 102, a rear sprocket assembly 99r coaxially mounted with rear wheel 106r, and an electrically controlled rear derailleur 97r. As shown in FIG. 5, front sprocket assembly 99f comprises two coaxially mounted sprockets F1-F2, and rear sprocket assembly 99r comprises ten coaxially mounted sprockets R1-R10. The number of teeth on front sprocket F1 is less than the number of teeth on rear sprocket F2. The numbers of teeth on rear sprockets R1-R10 gradually decrease from rear sprocket R1 to rear sprocket R10. As a result, rear sprocket R1 has the greatest number of teeth, and rear sprocket R10 has the least number of teeth. Front derailleur 97f switches chain 95 between selected ones of the front sprockets F1-F2, and rear derailleur 97r switches chain 95 among selected ones of the rear sprockets R1-R10. A front gear position sensor 133f (FIG. 6) senses the operating position of front derailleur 97f, and a rear gear position sensor 133r senses the operating position of rear derailleur 97r. A battery or some other power source (not shown) powers front and rear derailleurs 97f and 97r as well as other electrical components described herein.

Figure 2:
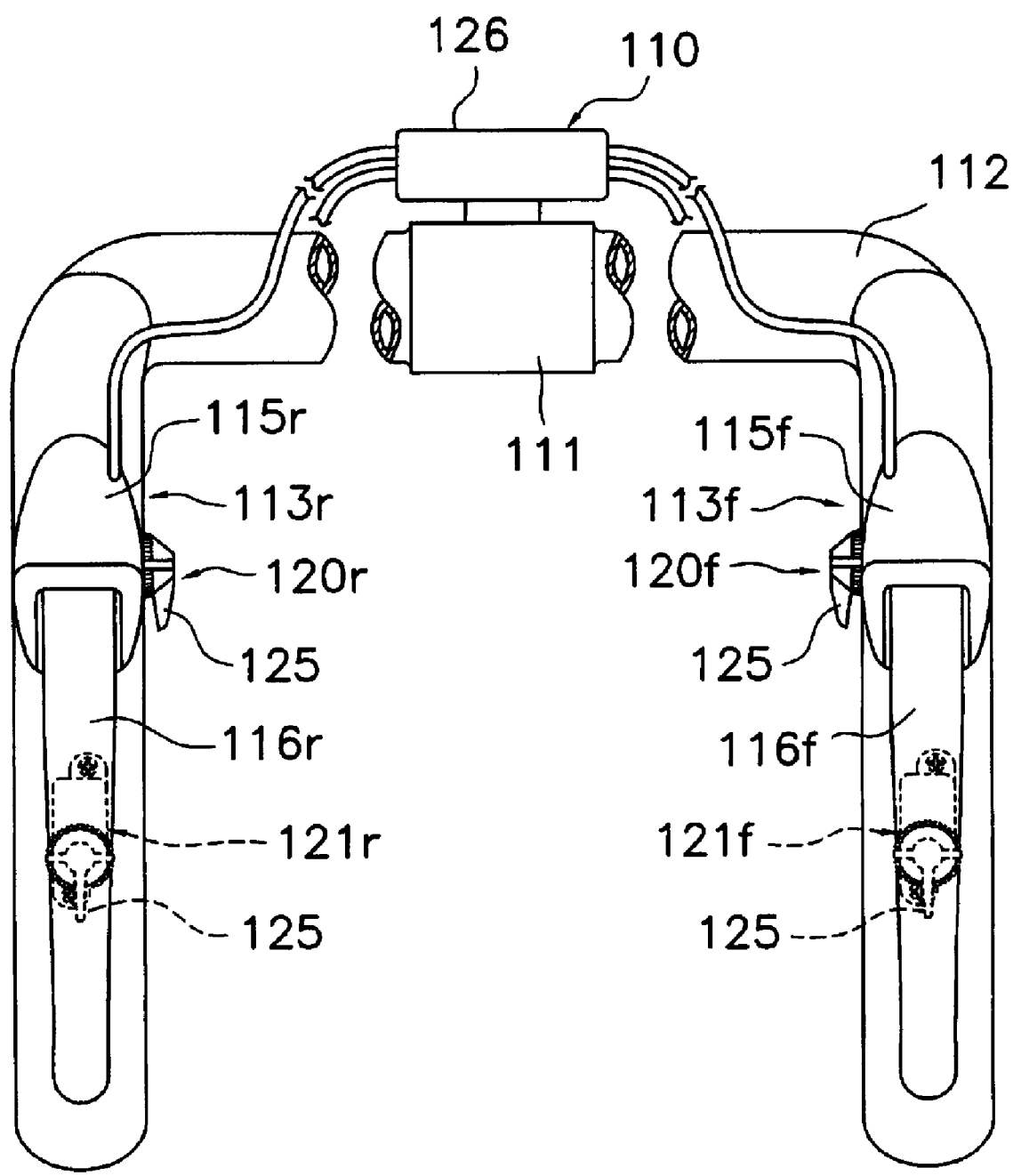
FIG. 2 is a front view of particular embodiments of brake lever assemblies mounted to the bicycle handlebar.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113f and 113r are mounted at opposite sides of handlebar 112. Brake lever assembly 113f controls the operation of front wheel brake 107f, and brake lever assembly 113r controls the operation of rear wheel brake 107r. A derailleur control device 110 is mounted to a central portion of handlebar 112.

Figure 3:
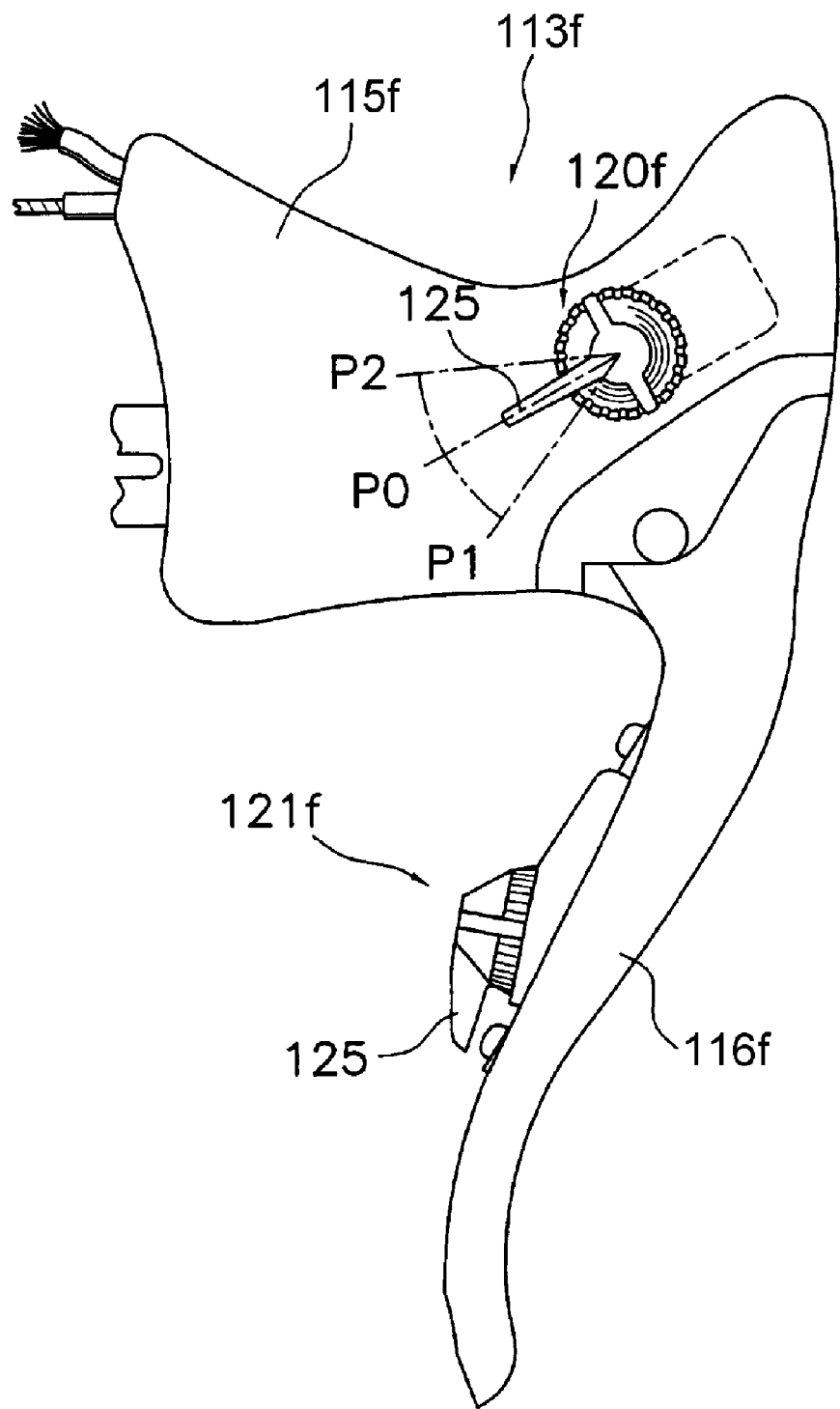
FIG. 3 is a side view of the rear brake lever assembly.
Figure 4:
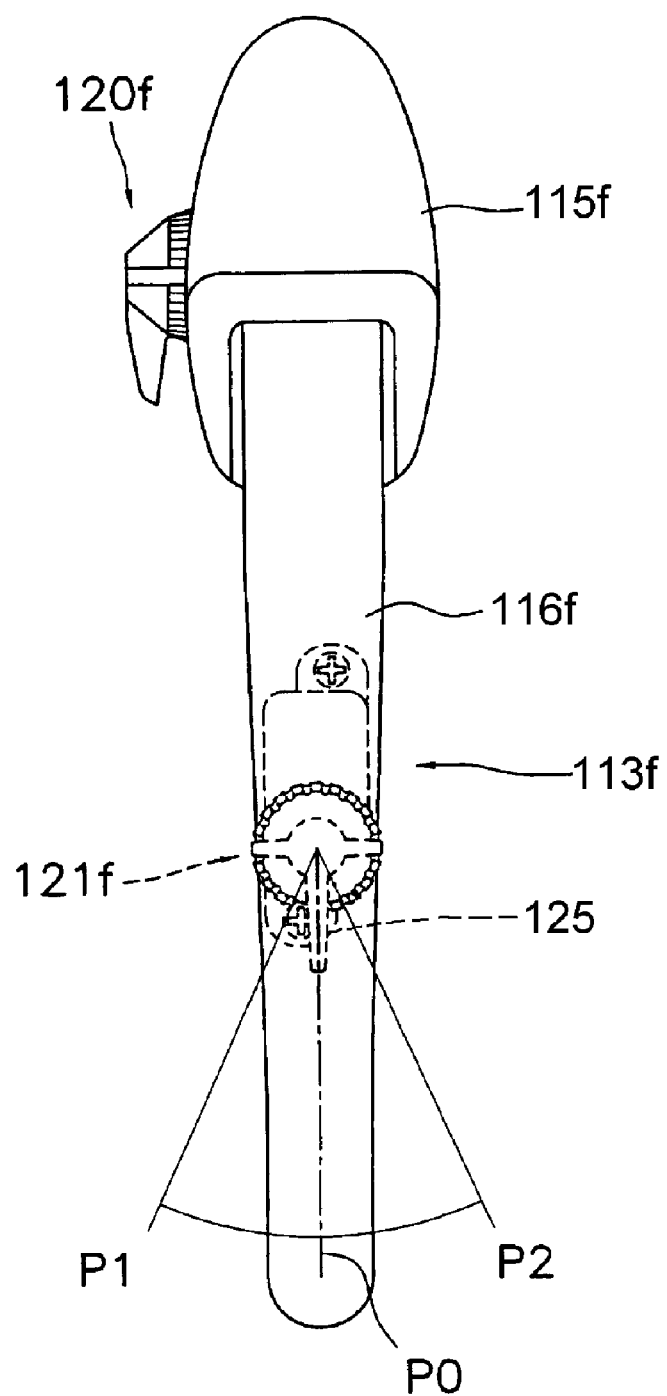
FIG. 4 is a front view of the rear brake lever assembly.

Brake lever assemblies 113f and 113r comprise respective brake brackets 115f and 115r mounted to the forward curved portions of handlebar 112, and brake levers 116f and 116r pivotably mounted to brake brackets 115f and 115r. Front shift control devices 120f and 121f with switch levers 125 are mounted to the inner side of brake bracket 115f and to the rear side of brake lever 116f, respectively, to control the operation of front derailleur 97f. In this embodiment, front shift control devices 120f and 121f independently control the operation of front derailleur 97f so that the rider may control the operation of front derailleur 97f with the hand grasping brake bracket 115f or with the hand grasping brake lever 116f. As shown in FIG. 3, the switch lever 125 mounted to brake lever bracket 115f rotates downward from a home position P0 to a first position P1 and rotates upward from the home position P0 to a second position P2 to control the operation of front derailleur 97f. As shown in FIG. 4, the switch lever 125 mounted to the rear of brake lever 116f rotates laterally inward from a home position P0 to a first position P1 and rotates laterally outward from the home position P0 to a second position P2 to control the operation of front derailleur 97f. Similarly, independent rear shift control devices 120r and 121r with switch levers 125 are mounted to the inner side of brake bracket 115r and to the rear side of brake lever 116r, respectively, to control the operation of rear derailleur 97r. The switch levers 125 mounted to brake lever bracket 115r and brake lever 116r operate in the same manner as switch levers 125 mounted to brake lever bracket 115f and brake lever 116f. All of the switch levers 125 are biased toward the home position P0.

A front upshift switch 131f (FIG. 6) and a front downshift switch 132f are mounted in each front shift control device 120f and 121f. The front upshift switches 131f operate when switch levers 125 in front shift control devices 120f and 121f rotate from position P0 to position P1, and the front downshift switches 132f operate when switch levers 125 in front shift control devices 120f and 121f rotate from position P0 to position P2. Similarly, a rear upshift switch 131r and a rear downshift switch 132r are mounted in each rear shift control device 120r and 121r. The rear upshift switches 131r operate when switch levers 125 in rear shift control devices 120r and 121r rotate from position P0 to position P1, and the rear downshift switches 132r operate when switch levers 125 in rear shift control devices 120r and 121r rotate from position P0 to position P2.

Figure 6:
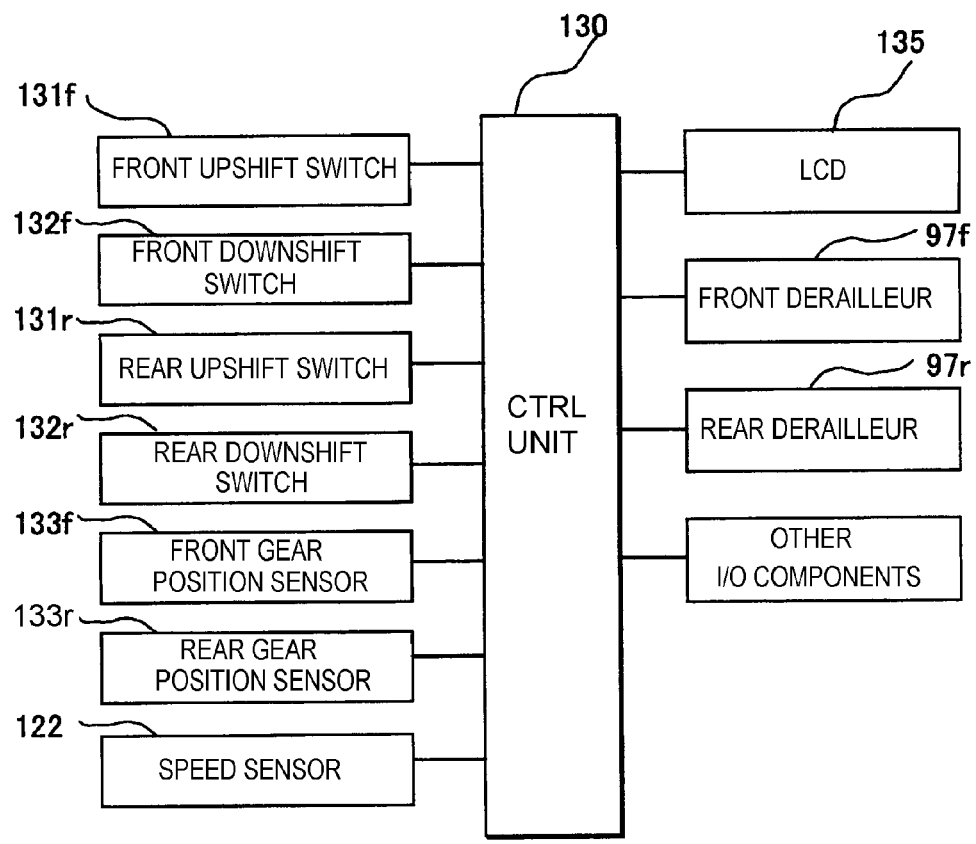
FIG. 6 is a schematic block diagram of a particular embodiment of a derailleur control apparatus.

As shown in FIGS. 2 and 6, derailleur control device 110 comprises a case 126 mounted onto the central portion of handlebar 112. Mounted within case 126 are a control unit 130 and a liquid crystal display (LCD). In this embodiment, control unit 130 is a programmed microprocessor, and liquid crystal display (LCD) is connected to control unit 130 for displaying riding parameters and other information. Front derailleur 97f, rear derailleur 97r, front upshift switch 131f, front downshift switch 132f, rear upshift switch 131r, rear downshift switch 132r, front gear position sensor 133f, rear gear position sensor 133r and other I/O components are connected to control unit 130 through appropriate methods such as wired or wireless devices. As shown in FIGS. 1 and 6, a speed sensor 122 is mounted to fork 98 to sense the passage of a magnet 123 mounted to a spoke 106s of front wheel 106s and to provide speed indicating signals to control unit 130.

In general, control unit 130 controls the operation of front derailleur 97f and rear derailleur 97r to shift chain 95 the distance from an origin sprocket to a destination sprocket in accordance with signals received from front and rear upshift switches 131f and 131r, front and rear downshift switches 132f and 132r, and front and rear gear position sensors 133f and 133r. Control unit 130 also displays speed, gear positions, and running distance in LCD 135, according to signals received from speed sensor 122 and gear position sensors 133f and 133r. In this embodiment, when an upshift or downshift is requested by the rider for an interval of time that is longer than normal for the application, then control unit 130 shifts the derailleur (e.g., front derailleur 97f) by a distance less than the distance between the origin and destination sprockets in order to fine tune the position of the derailleur.

Figure 7:
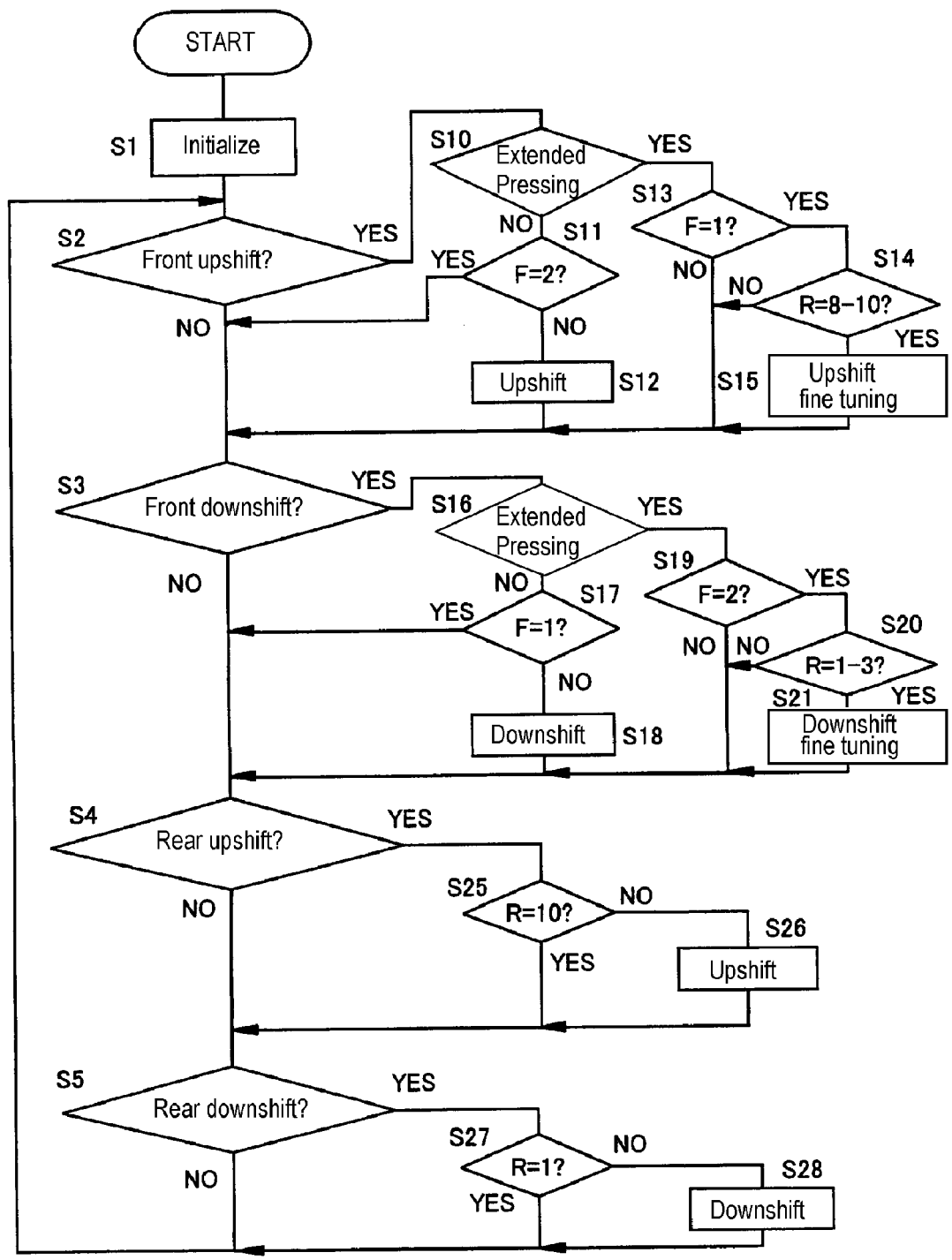
FIG. 7 is a flow chart of a particular embodiment of the operation of the derailleur control apparatus.

FIG. 7 is a flow chart of a particular embodiment of the operation of control unit 130 when the operating position of front derailleur 97f may be fine tuned. When electrical power is supplied to control unit 130, the system is initialized in a Step S1. In this step, various flags and variables are reset in a known manner. It is then determined in a Step S2 whether or not a front upshift has been requested by the operation of front shift control devices 120f and 121f (i.e., whether or nor a front upshift switch 131f has been operated by rotating the corresponding switch lever 125 from position P0 to position P1). If not, then it is determined in a Step S3 whether or not a front downshift has been requested by the operation of front shift control devices 120f and 121f (i.e., whether or nor a front downshift switch 132f has been operated by rotating the corresponding switch lever 125 from position P0 to position P2). If not, then it is determined in a Step S4 whether or not a rear upshift has been requested by the operation of rear shift control devices 120r and 121r (i.e., whether or nor a rear upshift switch 131r has been operated by rotating the corresponding switch lever 125 from position P0 to position P1). If not, then it is determined in a Step S5 whether or not a rear downshift has been requested by the operation of rear shift control devices 120r and 121r (i.e., whether or nor a rear downshift switch 132r has been operated by rotating the corresponding switch lever 125 from position P0 to position P2). If not, processing returns to Step S2.

Figure 8:
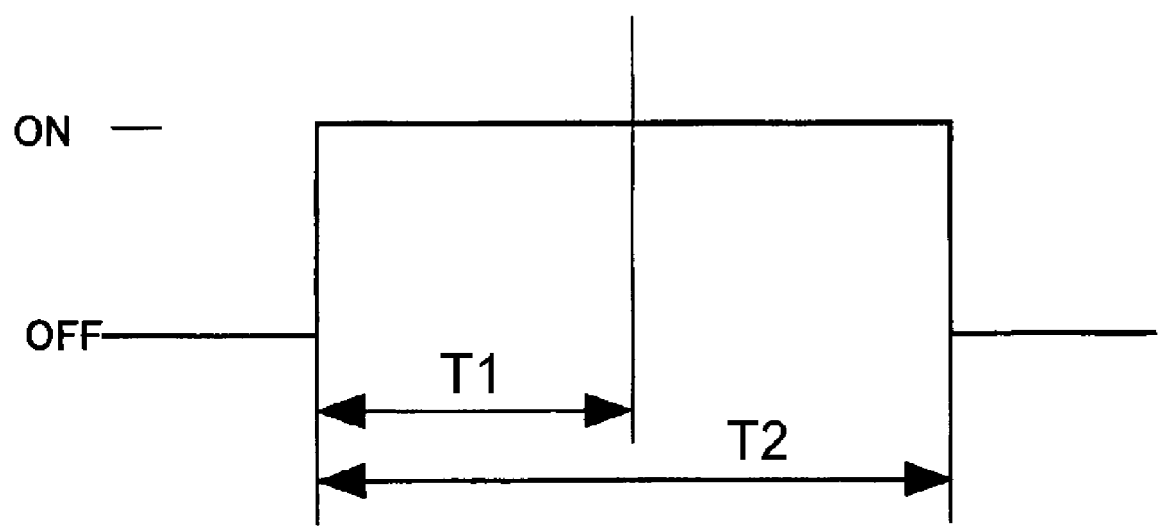
FIG. 8 is a diagram illustrating time intervals that may be used in the operation of the derailleur control apparatus.

If it is determined in Step S2 that a front upshift has been requested, it is then determined in a Step S10 whether or not the front upshift has been requested for a longer time interval than usual. This may be determined by ascertaining whether or not a front upshift switch 131f has been operated for a time interval greater than a time interval T1 shown in FIG. 8. In this embodiment, time interval T1 may be in the range of from approximately one second to approximately four seconds, and it is determined by the leading and trailing edges of the on/off signal produced by front upshift switch 131f. If the operation time has not exceeded time interval T1, then a regular upshift has been requested, and it is determined in a Step S11 from front gear position sensor 133f whether or not front derailleur 97f currently is positioned for engaging chain 95 with front sprocket F2. If so, then further upshifting is impossible, the upshift request is ignored, any upshift signal to front derailleur 97f is inhibited, and processing moves to Step S3. If front derailleur 97f currently is not positioned for engaging chain 95 with front sprocket F2 (i.e., front derailleur 97f is positioned for engaging chain 95 with sprocket F1), then processing moves to Step S12, control unit 130 provides a signal so that front derailleur 97f switches chain 95 from sprocket F1 to sprocket F2, and processing continues at Step S3.

If it is determined in Step S10 that front upshift switch 131f has been operated for a time greater than time interval T1, then it is assumed that a fine tuning of the position of front derailleur 97f is desired. The rider normally would make such a request based on the gear position being displayed on LCD 135 if noise is being generated by contact between chain 95 and front derailleur 97f. In that case, processing moves to Step S13, and it is determined whether or not front derailleur 97f currently is positioned for engaging chain 95 with front sprocket F1. If not, then front derailleur 97f currently is positioned for engaging chain 95 with front sprocket F2, no benefit would be obtained in this embodiment from moving front derailleur 97f further outward, the request is ignored, and processing moves to Step S3. On the other hand, if front derailleur 97f currently is positioned for engaging chain 95 with front sprocket F1, then moving front derailleur 97f further outward could have some benefit if chain 95 is at an extreme angle caused by engagement with one of the laterally outer sprockets in rear sprocket assembly 99r. Accordingly, it is then determined in a Step S14 from rear gear position sensor 133r whether or not rear derailleur 97r currently is positioned for engaging chain 95 with one of rear sprockets R8-R10. If not, then it is again assumed that no benefit would be obtained in this embodiment from moving front derailleur 97f further outward, the request is ignored, and processing moves to Step S3. On the other hand, if it is determined that rear derailleur 97r currently is positioned for engaging chain 95 with one of rear sprockets R8-R10, then chain 95 is inclined at a great angle from front sprocket F1 with the possibility that it is causing undesirable contact with front derailleur 97f, and it is assumed that fine tuning of the position of front derailleur 97f is in order. Such fine tuning is performed in a Step S15, and it comprises moving front derailleur 97f laterally outward by a distance less than the distance between front sprockets F1 and F2. More specifically, front derailleur 97f may be moved laterally outward a small distance, e.g., from approximately 0.5 mm to approximately 2 mm (or more or less, depending upon the application), preferably 1 mm. Processing then continues in Step S3.

If it is determined in Step S3 that a front downshift has been requested, it is then determined in a Step S16 whether or not the front downshift has been requested for a longer time interval than usual. That is, whether or not a front downshift switch 132f has been operated for a time interval greater than time interval T1. If the operation time has not exceeded time interval T1, then a regular downshift has been requested, and it is determined in a Step S17 whether or not front derailleur 97f currently is positioned for engaging chain 95 with front sprocket F1. If so, then further downshifting is impossible, the downshift request is ignored, and processing moves to Step S4. If front derailleur 97f currently is not positioned for engaging chain 95 with front sprocket F1 (i.e., front derailleur 97f is positioned for engaging chain 95 with sprocket F2), then processing moves to Step S18, control unit 130 provides a signal so that front derailleur 97f switches chain 95 from sprocket F2 to sprocket F1, and processing continues at Step S4.

If it is determined in Step S16 that front downshift switch 132f has been operated for a time greater than time interval T1, then it is assumed that a fine tuning of the position of front derailleur 97f is desired. In that case, processing moves to Step S19, and it is determined whether or not front derailleur 97f currently is positioned for engaging chain 95 with front sprocket F2. If not, then front derailleur 97f currently is positioned for engaging chain 95 with front sprocket F1, no benefit would be obtained in this embodiment from moving front derailleur 97f further inward, the request is ignored, and processing moves to Step S4. On the other hand, if front derailleur 97f currently is positioned for engaging chain 95 with front sprocket F2, then moving front derailleur 97f further inward could have some benefit if chain 95 is at an extreme angle caused by engagement with one of the laterally inner sprockets in rear sprocket assembly 99r. Accordingly, it is then determined in a Step S20 whether or not rear derailleur 97r currently is positioned for engaging chain 95 with one of rear sprockets R2-R3. If not, then it is again assumed that no benefit would be obtained in this embodiment from moving front derailleur 97f further inward, the request is ignored and processing moves to Step S4. On the other hand, if it is determined that rear derailleur 97r currently is positioned for engaging chain 95 with one of rear sprockets R2-R3, then chain 95 is inclined at a great angle from front sprocket F2 with the possibility that it is causing undesirable contact with front derailleur 97f, and it is assumed that fine tuning of the position of front derailleur 97f is in order. Such fine tuning is performed in a Step S21, and it comprises moving front derailleur 97f laterally inward, such as by the small distance noted above for Step S15. Processing then continues at Step S4.

In the fine tuning operations performed in Steps S15 and S21 discussed above, the fine tuning distance was predetermined. However, it is possible to vary the fine tuning distance at the time the fine tuning operation is performed. For example, the fine tuning distance could be a function of the operating time interval T2 of the corresponding front upshift switch 131f or front downshift switch 132f, alone or in combination with time interval T1 or some other parameter. For example, the distance may be proportional to time interval T2 or to a difference between time intervals T1 and T2 (e.g., T2-T1). The distance may include a combination of a predetermined distance and an incremental distance determined by a function of time interval T2 alone or in combination with time interval T1 or some other parameter. The fine tuning distances may be implemented in continuous increments, in steps, or any combination of the two.

By fine tuning the position of front derailleur 97f in the above manner, it is possible to eliminate undesirable contact between chain 95 and front derailleur 97f when chain 95 is greatly inclined. Also, since the fine tuning operation is performed with the same switches used for normal derailleur operation, an additional dedicated fine tuning switch need not be provided.

If it is determined in Step S4 that a rear upshift has been requested, it is then determined in a Step S25 whether or not rear derailleur 97r currently is positioned for engaging chain 95 with rear sprocket R10. If so, then further upshifting is impossible, the upshift request is ignored, and processing moves to Step S5. If rear derailleur 97r currently is not positioned for engaging chain 95 with rear sprocket R10, then processing moves to Step S26, and control unit 130 provides a signal so that rear derailleur 97r switches chain 95 to the next laterally outer sprocket in rear sprocket assembly 99r.

If it is determined in Step S5 that a rear downshift has been requested, it is then determined in a Step S27 whether or not rear derailleur 97r currently is positioned for engaging chain 95 with rear sprocket R1. If so, then further downshifting is impossible, the downshift request is ignored, and processing moves to Step S2. If rear derailleur 97r currently is not positioned for engaging chain 95 with rear sprocket R1, then processing moves to Step S28, and control unit 130 provides a signal so that rear derailleur 97r switches chain 95 to the next laterally inner sprocket in rear sprocket assembly 99r.

Figure 9:
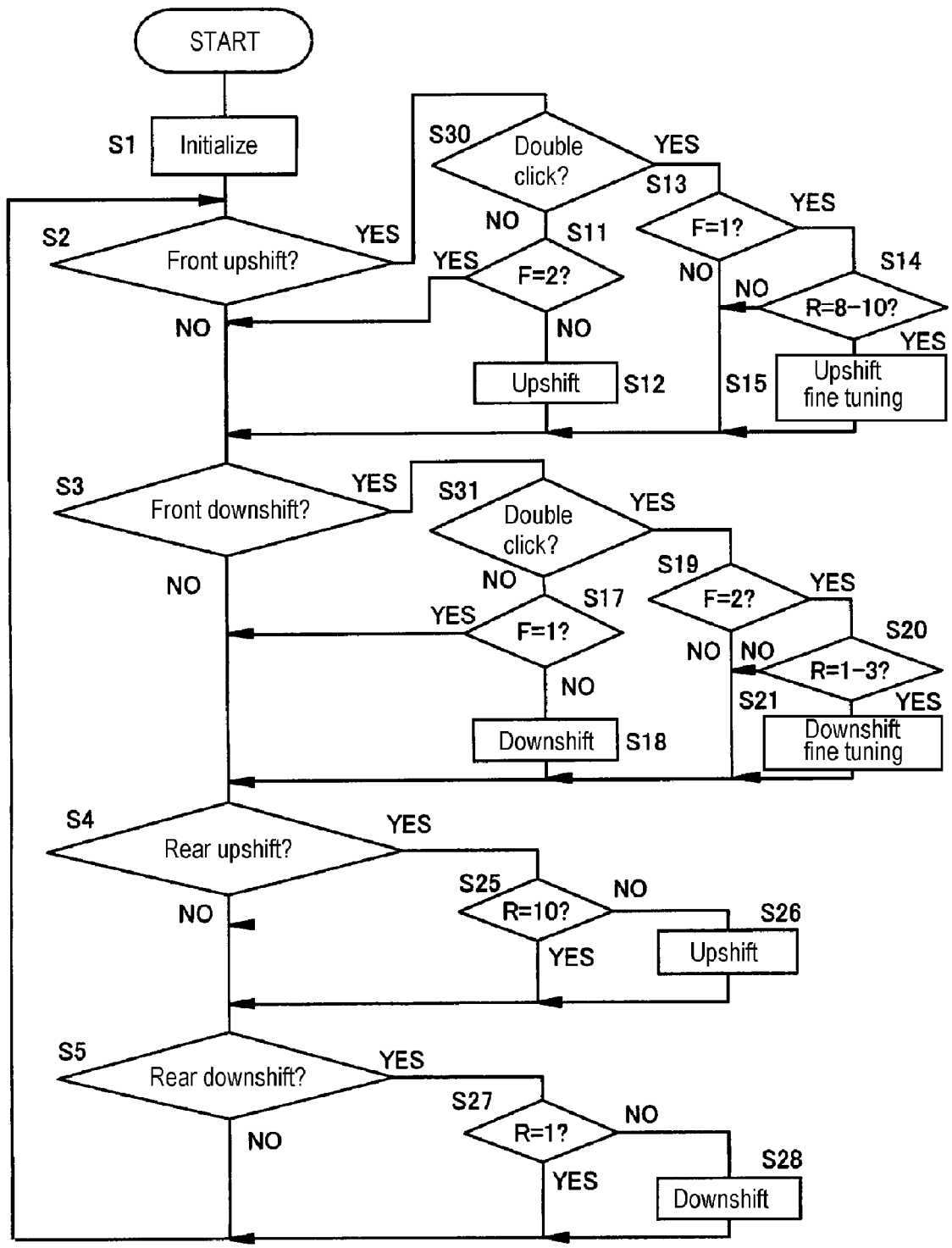
FIG. 9 is a flow chart of another embodiment of the operation of the derailleur control apparatus.

FIG. 9 is a flow chart of another embodiment of the operation of control unit 130. In this embodiment, a fine tuning operation is requested not by continuously operating front upshift switch 131f and front downshift switch 132f for a particular time interval, but by operating the switches a plurality of times within a particular time interval. For example, by performing a "double-clicking" operation. The steps shown in FIG. 9 are identical to the steps shown in FIG. 7, except Steps S30 and S31 in FIG. 9 have replaced Steps S10 and S16 in FIG. 7. Accordingly, a detailed description of the identical steps is omitted.

In each of Steps S30 and S31, it is determined whether or not the respective front upshift switch 131*f* and front downshift switch 132*f* has been operated twice (i.e., a double-clicking operation) in a particular time interval T3 (e.g., from approximately 0.1 second to approximately 1.0 second). If so, then processing continues at Steps S13 and S19 as in FIG. 7, with fine-tuning performed when appropriate. Otherwise, processing continues at Steps S11 and S17 as in FIG. 7.

Figure 10:
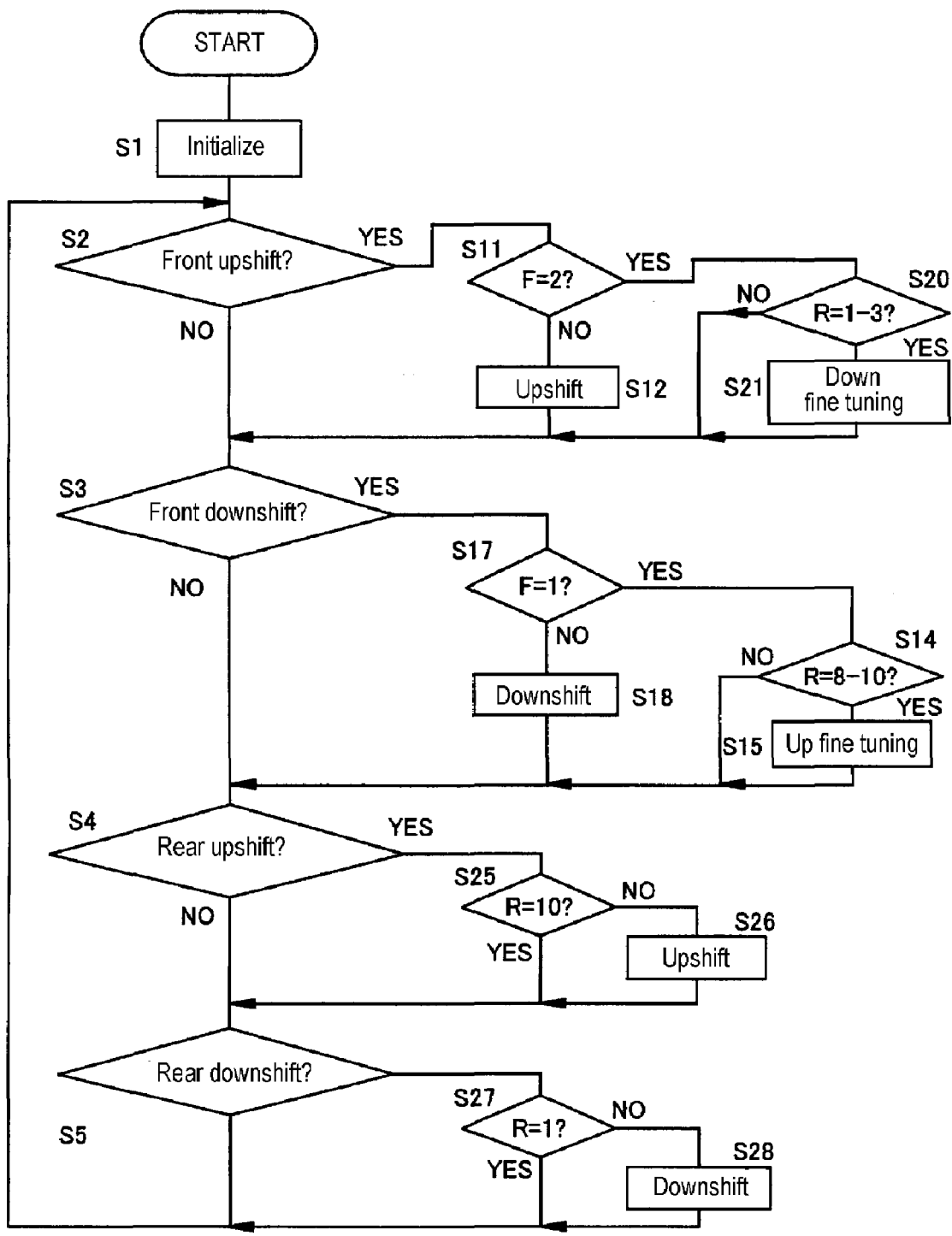
FIG. 10 is a flow chart of another embodiment of the operation of the derailleur control apparatus.

FIG. 10 is a flow chart of another embodiment of the operation of control unit 130. In this embodiment, a front upshift request made when front derailleur 97*f* currently is positioned for engaging chain 95 with front sprocket F2 (i.e., further upshifting is impossible) is interpreted to be a request for fine tuning in the downshift direction. Similarly, a front downshift request made when front derailleur 97*f* currently is positioned for engaging chain 95 with front sprocket F1 (i.e., further downshifting is impossible) is interpreted to be a request for fine tuning in the upshift direction. In other words, front derailleur 97*f* is moved in the direction opposite the requested direction. The steps shown in FIG. 10 that are numbered the same as the steps shown in FIG. 7 are identical, so any steps not described here are the same as in FIG. 7.

If it is determined in Step S2 that a front upshift has been requested, it is then determined in Step S11 whether or not front derailleur 97*f* currently is positioned for engaging chain 95 with front sprocket F2 (i.e., further upshifting is impossible). If not, then processing moves to Step S12, control unit 130 provides a signal so that front derailleur 97*f* switches chain 95 from sprocket F1 to sprocket F2, and processing continues at Step S3. If front derailleur 97*f* currently is positioned for engaging chain 95 with front sprocket F2, it is then determined in Step S20 whether or not rear derailleur 97*r* currently is positioned for engaging chain 95 with one of rear sprockets R1-R3. If not, then it is assumed that no benefit would be obtained in this embodiment from moving front derailleur 97*f* further inward, the request is ignored, and processing moves to Step S3. On the other hand, if rear derailleur 97*r* currently is positioned for engaging chain 95 with one of rear sprockets R1-R3, then chain 95 is inclined at a great angle from front sprocket F2 with the possibility that it is causing undesirable contact with front derailleur 97*f*, and it is assumed that fine tuning of the position of front derailleur 97*f* is in order. Such fine tuning is performed in a Step S21, and it comprises moving front derailleur 97*f* laterally inward by a small distance. Processing then moves to Step S3.

If it is determined in Step S3 that a front downshift has been requested, it is then determined in Step S17 whether or not front derailleur 97*f* currently is positioned for engaging chain 95 with front sprocket F1 (i.e., further downshifting is impossible). If not, then processing moves to Step S18, control unit 130 provides a signal so that front derailleur 97*f* switches chain 95 from sprocket F2 to sprocket F1, and processing continues at Step S4. If front derailleur 97*f* currently is positioned for engaging chain 95 with front sprocket F1, it is then determined in Step S14 whether or not rear derailleur 97*r* currently is positioned for engaging chain 95 with one of rear sprockets R8-R10. If not, then it is assumed that no benefit would be obtained in this embodiment from moving front derailleur 97*f* further outward, the request is ignored, and processing moves to Step S4. On the other hand, if rear derailleur 97*r* currently is positioned for engaging chain 95 with one of rear sprockets R8-R10, then chain 95 is inclined at a great angle from front sprocket F1 with the possibility that it is causing undesirable contact with front derailleur 97*f*, and it is assumed that fine tuning of the position of front derailleur 97*f* is in order. Such fine tuning is performed in a Step S15, and it comprises moving front derailleur 97*f* laterally outward by a small distance. Processing then moves to Step S4.

Figure 11:
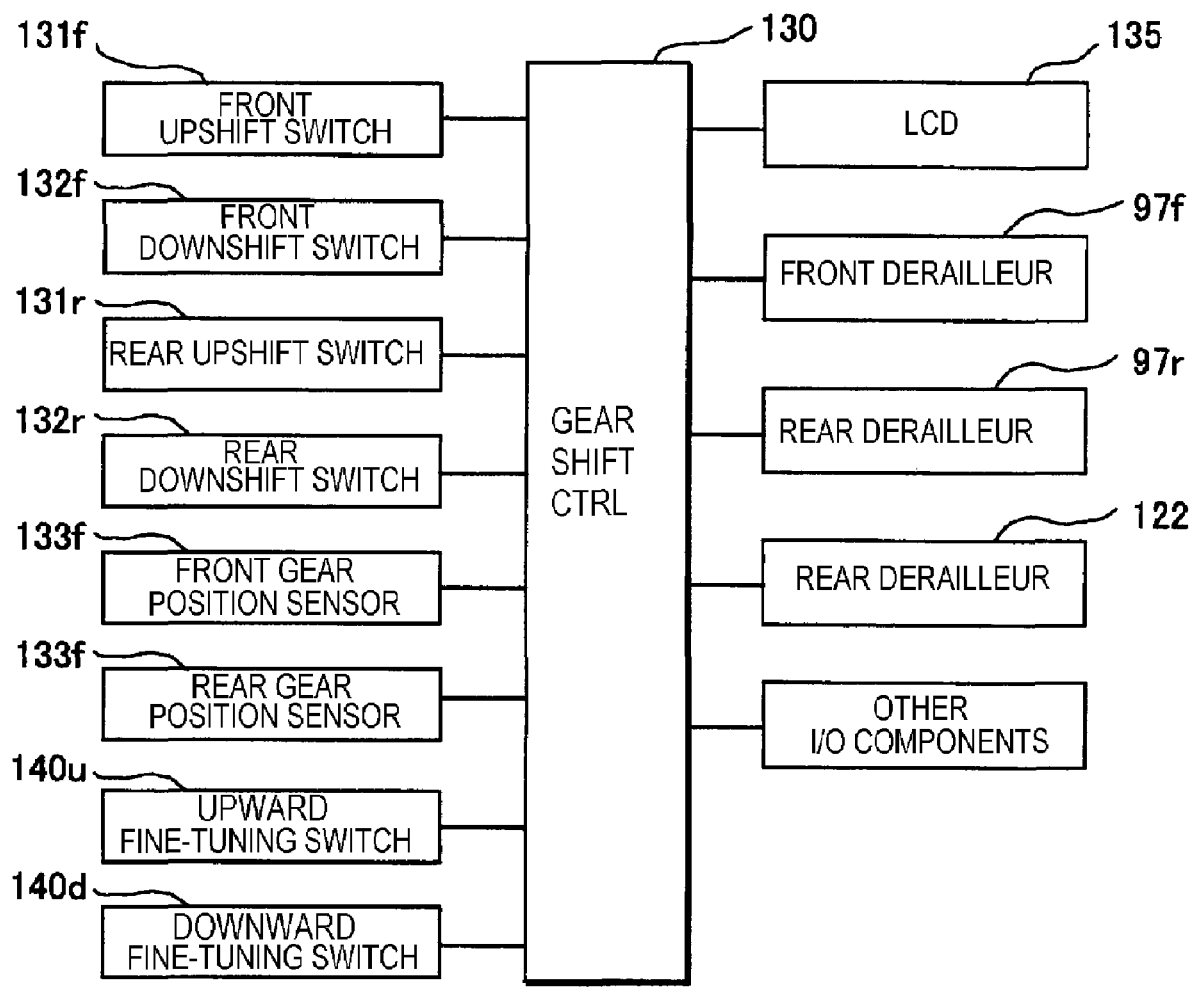
FIG. 11 is a schematic block diagram of another embodiment of a derailleur control apparatus.

FIG. 11 is a schematic block diagram of another embodiment of a derailleur control apparatus. In this embodiment, separate switches are used to request fine tuning of front derailleur 97. More specifically, upward fine tuning switches 140*u* and downward fine tuning switches 140*d* are connected to control unit 130 through appropriate methods such as wired or wireless devices. The other components are the same as in FIG. 6.

Figure 12:
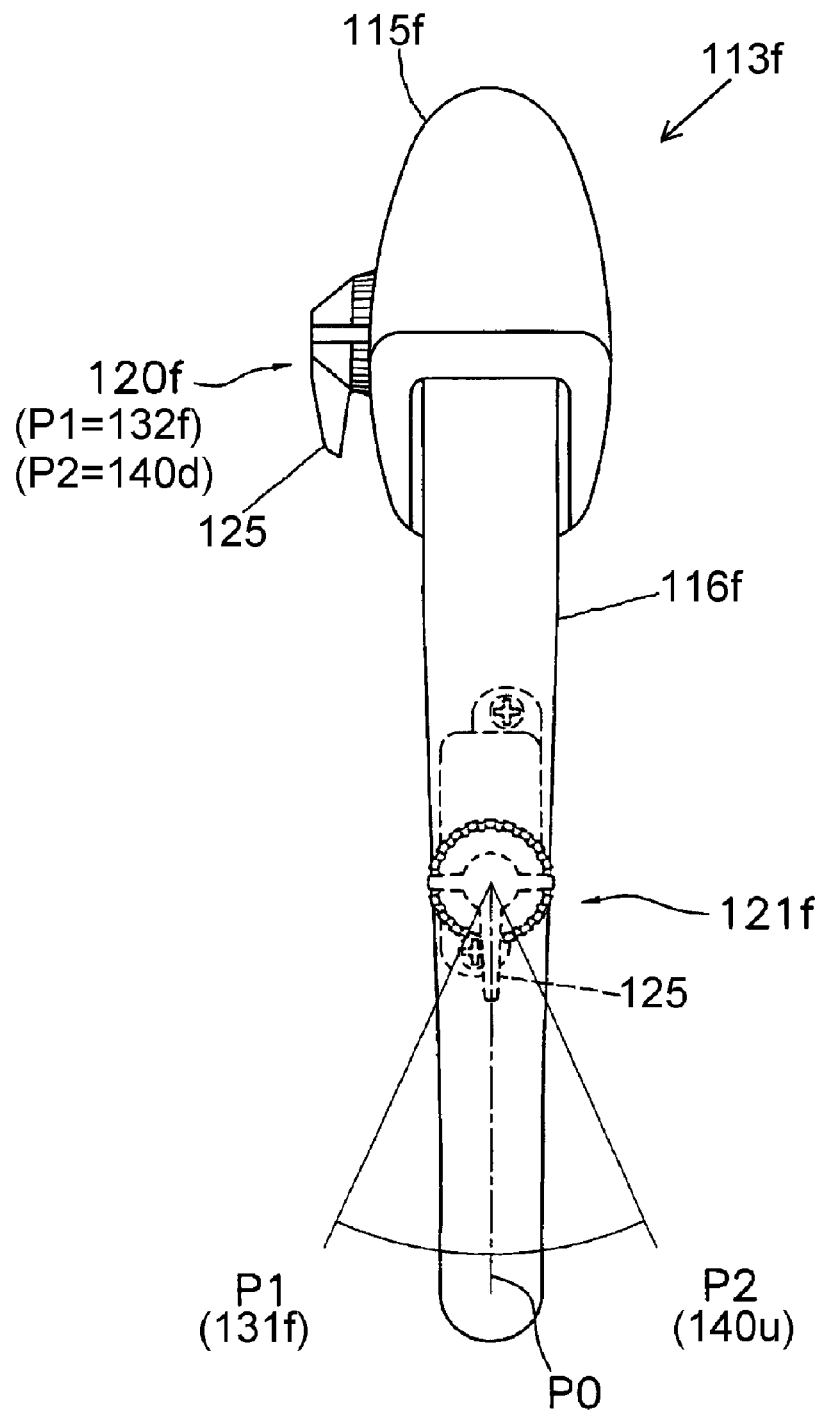
FIG. 12 is a front view of an embodiment of a front brake lever assembly that may be used in the embodiment shown in FIG. 11.

FIG. 12 is a front view of an embodiment of a front brake lever assembly 113*f* that may be used in the embodiment shown in FIG. 11. The provision and placement of front shift control devices 120*f* and 121*f* are the same as in the first embodiment. Also, switch levers 125 move between positions P0, P1 and P2 as in the first embodiment. However, in this embodiment, front downshift switch 132*f* is operated by moving switch lever 125 of front shift control device 120*f* to position P1; downward fine tuning switch 140*d* is operated by moving switch lever 125 of front shift control device 120*f* to position P2; front upshift switch 131*f* is operated by moving switch lever 125 of front shift control device 121*f* to position P1; and upward fine tuning switch 140*u* is operated by moving switch lever 125 of front shift control device 121*f* to position P2.

Of course, many different switch combinations are possible. For example, fine tuning may be accomplished using front shift control device 120*f*, and regular upshift and downshift operations may be accomplished using front shift control device 121*f*. In that case, upward fine tuning switch 140*u* may be operated by moving switch lever 125 of front shift control device 120*f* to position P1; downward fine tuning switch 140*d* may be operated by moving switch lever 125 of front shift control device 120*f* to position P2; front upshift switch 131*f* may be operated by moving switch lever 125 of front shift control device 121*f* to position P1; and front downshift switch 132*f* may be operated by moving switch lever 125 of front shift control device 121*f* to position P2.

Figure 13:
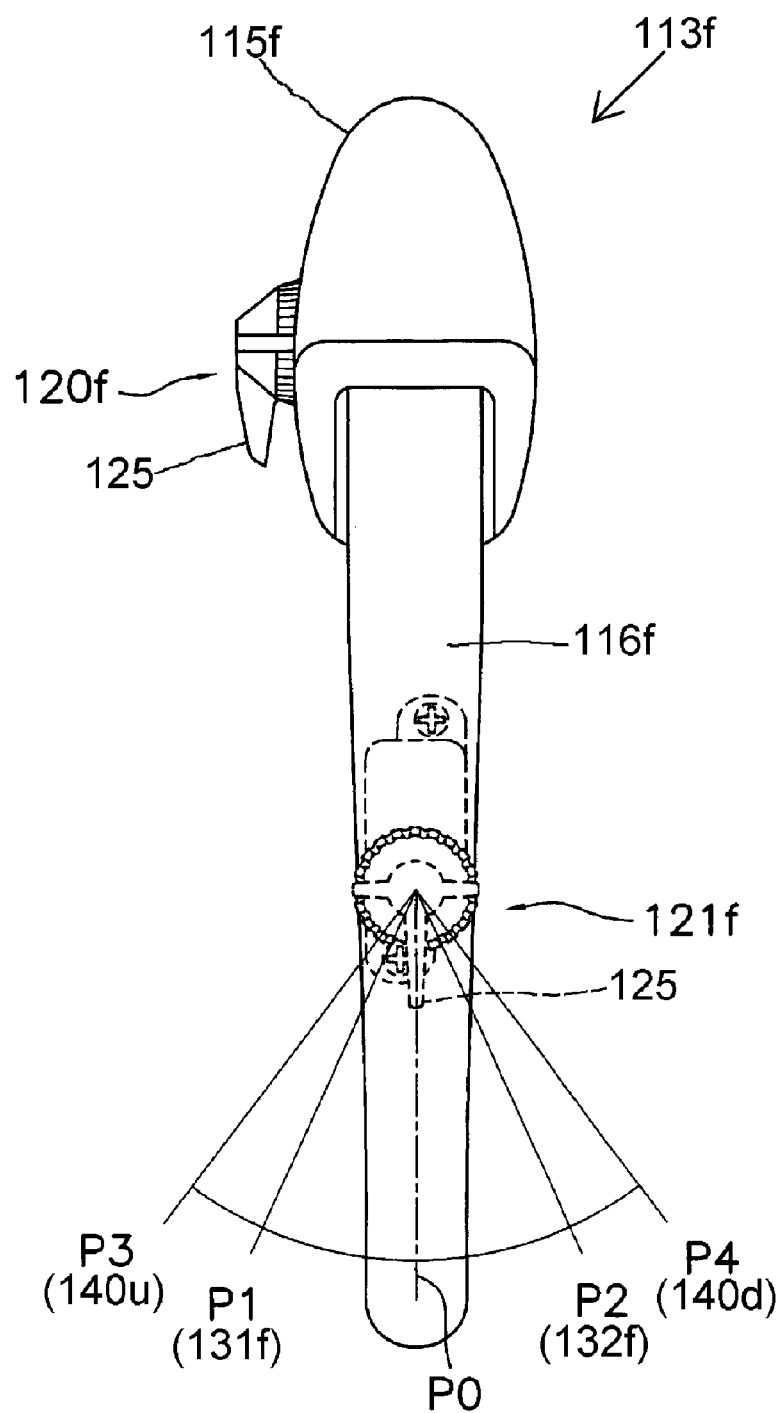
FIG. 13 is a front view of another embodiment of a front brake lever assembly that may be used in the embodiment shown in FIG. 11.

FIG. 13 is a front view of another embodiment of a front brake lever assembly 113*f* that may be used in the embodiment shown in FIG. 11. The provision and placement of front shift control devices 120*f* and 121*f* are the same as in the first embodiment. As in the first embodiment, operating either one of front shift control devices 120*f* and 121*f* may perform ordinary upshifting and downshifting operations independently of the other. Furthermore, switch levers 125 again move between positions P0, P1 and P2 as in the first embodiment. However, in this embodiment, switch levers 125 also move from home position P0 to an upward fine tuning position P3 and from home position P0 to a downward fine tuning position P4. Upward fine tuning switches 140*u* operate when switch levers 125 move to position P3, and downward fine tuning switches 140*d* operate when switch levers 125 move to position P4. Detents may be provided so that the rider can distinguish between the various positions P0-P4.

Figure 14:
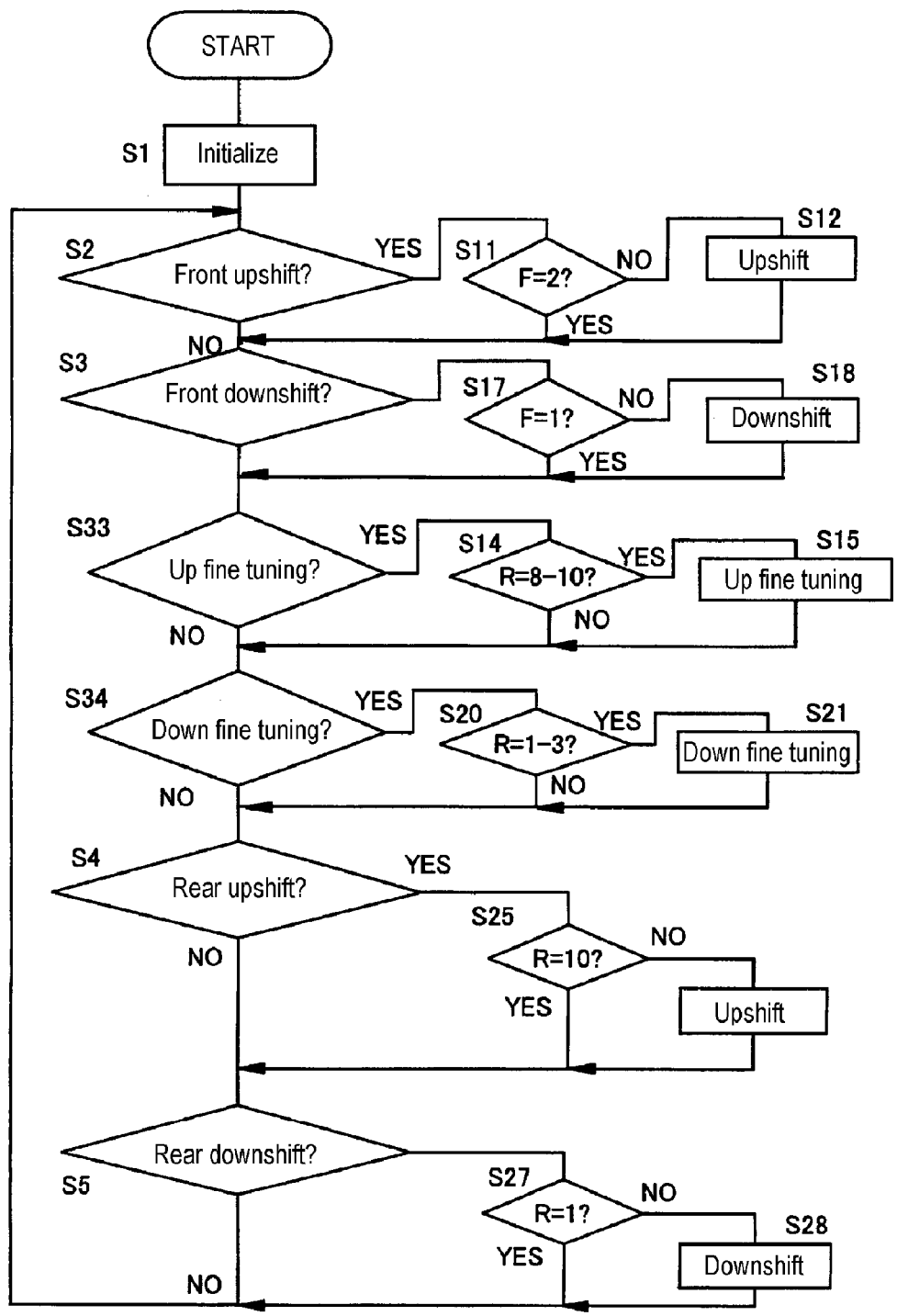
FIG. 14 is a flow chart of an embodiment of the operation of the derailleur control apparatus shown in FIG. 11.

FIG. 14 is a flow chart of an embodiment of the operation of the derailleur control apparatus shown in FIG. 11. When electrical power is supplied to control unit 130, the system is initialized in a Step S1 as in the first embodiment. It is then determined in Step S2 whether or not a front upshift has been requested by the operation of front shift control devices 120*f* and 121*f*. If not, then it is determined in a Step S3 whether or not a front downshift has been requested by the operation of front shift control devices 120*f* and 121*f*. If not, then it is determined in a Step S33 whether or not an upward fine tuning operation has been requested by the operation of front shift control devices 120*f* and 121*f*. If not, then it is determined in a Step S34 whether or not a downward fine tuning operation has been requested by the operation of front shift control devices 120*f* and 121*f*. If not, then it is determined in Step S4 whether or not a rear upshift has been requested by the operation of rear shift control devices 120*r* and 121*r*. If not, then it is determined in Step S5 whether or not a rear downshift has been requested by the operation of rear shift control devices 120*r* and 121*r*. If not, processing returns to Step S2.

If it is determined in Step S2 that a front upshift has been requested, it is then determined in Step S11 whether or not front derailleur 97*f* currently is positioned for engaging chain 95 with front sprocket F2. If so, then further upshifting is impossible, the upshift request is ignored, any upshift signal to front derailleur 97*f* is inhibited, and processing moves to Step S3. If front derailleur 97*f* currently is not positioned for engaging chain 95 with front sprocket F2 (i.e., front derailleur 97*f* is positioned for engaging chain 95 with sprocket F1), then processing moves to Step S12, control unit 130 provides a signal so that front derailleur 97*f* switches chain 95 from sprocket F1 to sprocket F2, and processing continues at Step S3.

If it is determined in Step S3 that a front downshift has been requested, it is then determined in Step S17 whether or not front derailleur 97*f* currently is positioned for engaging chain 95 with front sprocket F1. If so, then further downshifting is impossible, the downshift request is ignored, and processing moves to Step S33. If front derailleur 97*f* currently is not positioned for engaging chain 95 with front sprocket F1 (i.e., front derailleur 97*f* is positioned for engaging chain 95 with sprocket F2), then processing moves to Step S18, control unit 130 provides a signal so that front derailleur 97*f* switches chain 95 from sprocket F2 to sprocket F1, and processing continues at Step S33.

If it is determined in Step S33 that an upward fine tuning operation has been requested, then processing moves to Step S14, and it is determined whether or not rear derailleur 97*r* currently is positioned for engaging chain 95 with one of rear sprockets R8-R10. If not, then it is assumed that no benefit would be obtained in this embodiment from moving front derailleur 97*f* further outward, the request is ignored, and processing moves to Step S34. On the other hand, if it is determined that rear derailleur 97*r* currently is positioned for engaging chain 95 with one of rear sprockets R8-R10, then upward fine tuning is performed in Step S15 by moving front derailleur 97*f* laterally outward by a small distance, and processing continues in Step S34.

If it is determined in Step S34 that a downward fine tuning operation has been requested, then processing moves to Step S20, and it is determined whether or not rear derailleur 97*r* currently is positioned for engaging chain 95 with one of rear sprockets R1-R3. If not, then it is assumed that no benefit would be obtained in this embodiment from moving front derailleur 97*f* further inward, the request is ignored, and processing moves to Step S4. On the other hand, if it is determined that rear derailleur 97*r* currently is positioned for engaging chain 95 with one of rear sprockets R1-R3, then downward fine tuning is performed in Step S21 by moving front derailleur 97*f* laterally inward by the small distance, and processing continues in Step S4. The remaining processing is the same as in the first embodiment. If desired, the fine tuning distance may be varied based on the operating time of upward and downward fine tuning switches 140*u* and 140*d* or by some other formula.

Figure 15:
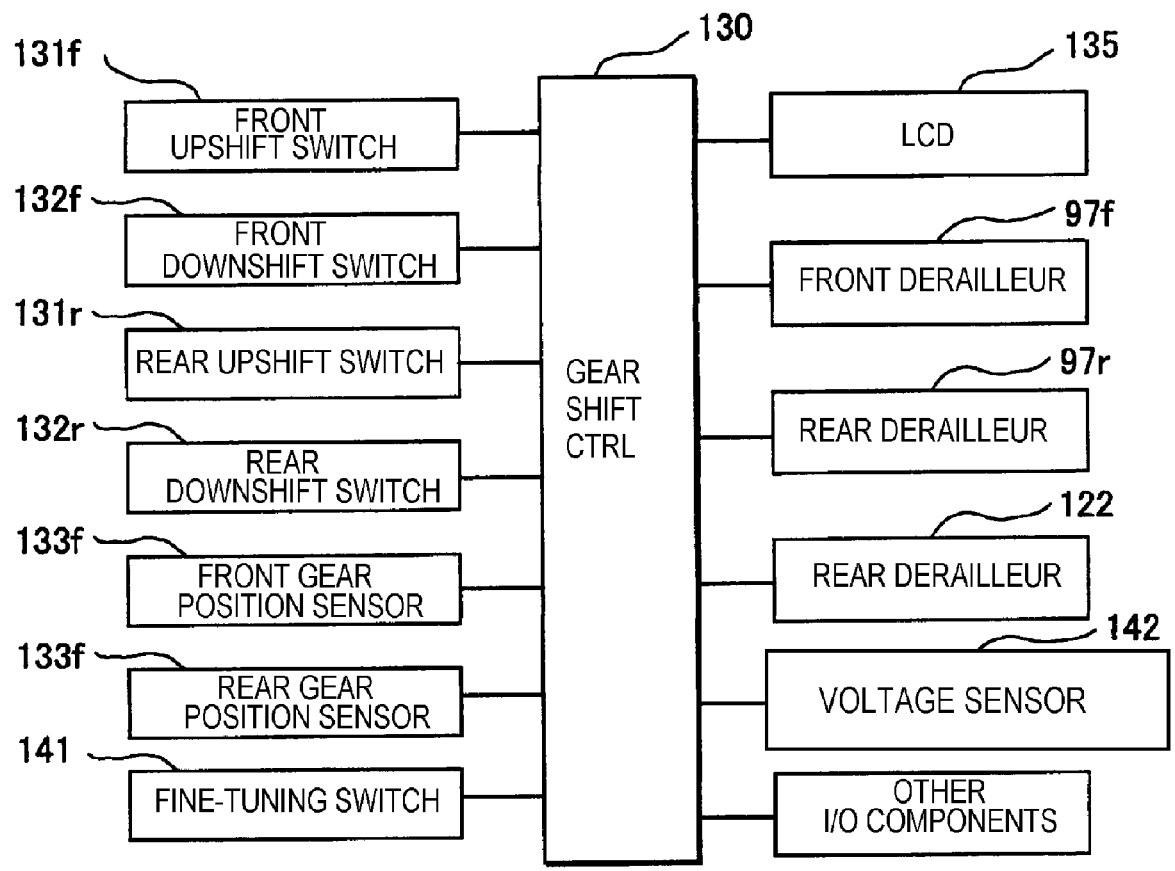
FIG. 15 is a schematic block diagram of another embodiment of a derailleur control apparatus.
Figure 16:
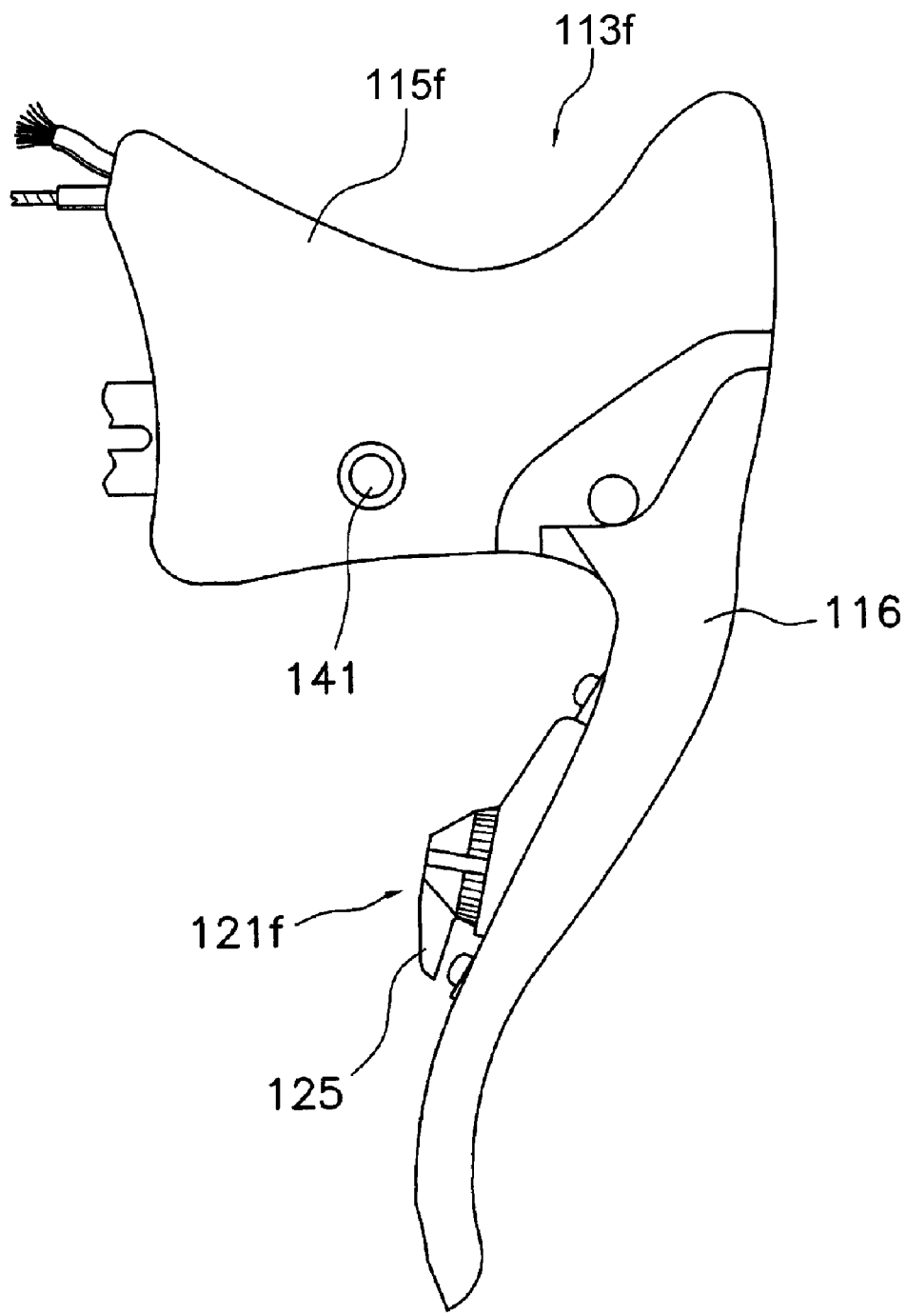
FIG. 16 is a side view of an embodiment of a front brake lever assembly that may be used in the embodiment shown in FIG. 11.

FIG. 15 is a schematic block diagram of another embodiment of a derailleur control apparatus. In this embodiment, a single dedicated fine tuning switch 141 is provided to perform fine tuning of front derailleur 97*f*. As shown in FIG. 16, fine tuning switch 141 may comprise a push button disposed on the side of brake bracket 115*f*. Also, a voltage sensor 142 is provided to sense the voltage of a power supply (not shown) used to power front and rear derailleurs 97*f* and 97*r*. If the voltage of the power supply falls below a selected threshold value, then any requested fine tuning operation is canceled. The other components are otherwise the same as in the first embodiment.

Figure 17:
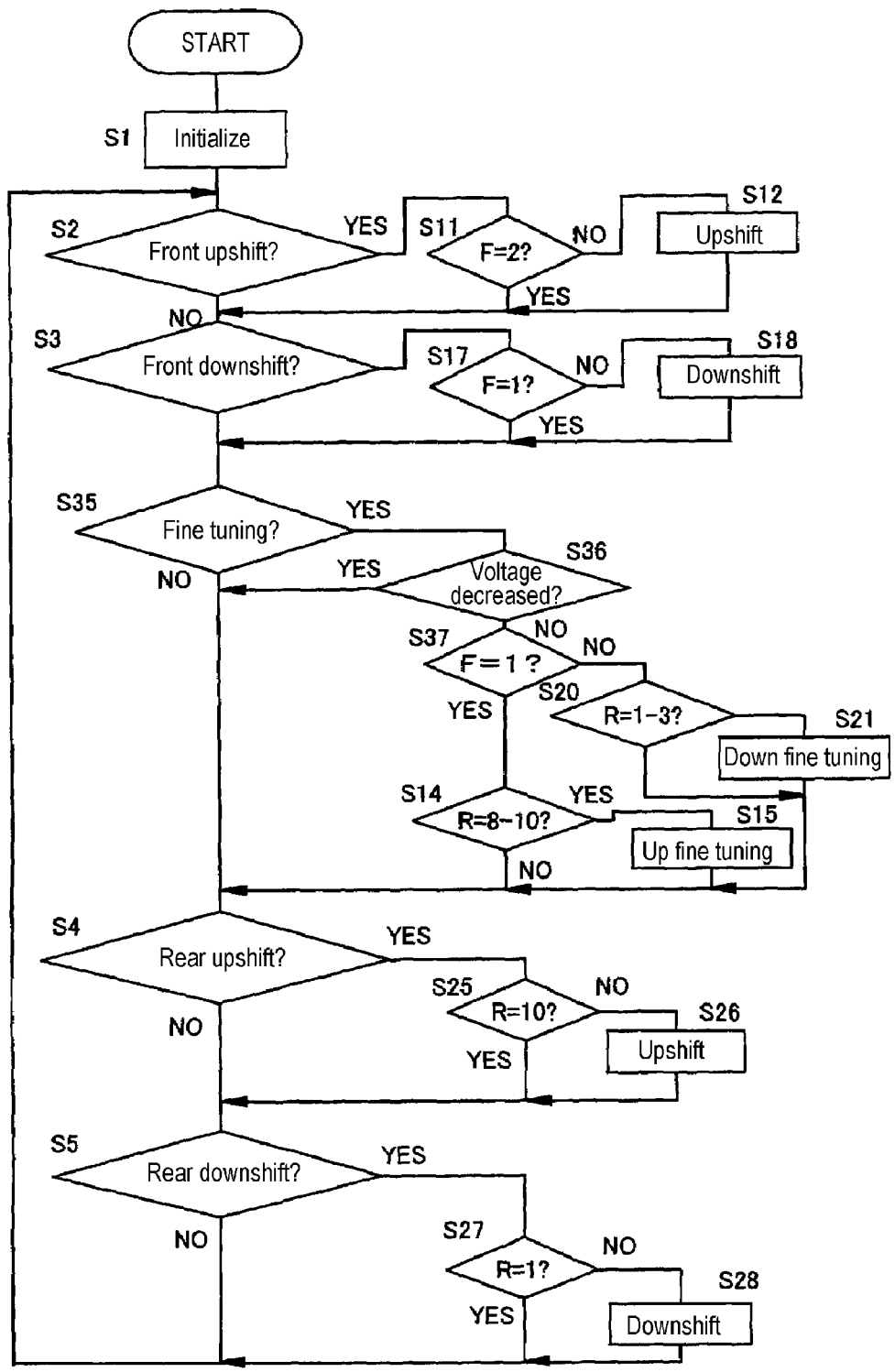
FIG. 17 is a flow chart of an embodiment of the operation of the derailleur control apparatus shown in FIG. 15.

FIG. 17 is a flow chart of an embodiment of the operation of the derailleur control apparatus shown in FIG. 15. The operation of this embodiment is the same as that shown in FIG. 14, except the separate fine tuning determinations in Steps S33 and S34 and their subsequent operations are combined at Step S35. More specifically, It is determined in Step S33 whether or not a fine tuning operation has been requested by the operation of fine tuning switch 141. If not, then processing simply moves to Step S4. Otherwise, processing moves to Step S36, and it is determined from voltage sensor 142 whether or not the power supply voltage has fallen below a selected level (e.g., 50% of the normal voltage level). If so, then the fine tuning request is ignored, and processing moves to Step S4. If the power supply voltage is acceptable, then it is determined in a Step S37 whether or not front derailleur 97*f* currently is positioned for engaging chain 95 with front sprocket F1. If so, it is then determined in a Step S14 whether or not rear derailleur 97*r* currently is positioned for engaging chain 95 with one of rear sprockets R8-R10. If not, then it is assumed that no benefit would be obtained in this embodiment from moving front derailleur 97*f* further outward, the request is ignored, and processing moves to Step S4. On the other hand, if it is determined that rear derailleur 97*r* currently is positioned for engaging chain 95 with one of rear sprockets R8-R10, then upward fine tuning is performed in Step S15 by moving front derailleur 97*f* laterally outward by a small distance, and processing continues in Step S4. If it is determined in Step S37 that front derailleur 97*f* currently is not positioned for engaging chain 95 with front sprocket F1 (i.e., front derailleur 97*f* currently is positioned for engaging chain 95 with front sprocket F2), then processing moves to Step S20, and it is determined whether or not rear derailleur 97*r* currently is positioned for engaging chain 95 with one of rear sprockets R1-R3. If not, then it is assumed that no benefit would be obtained in this embodiment from moving front derailleur 97*f* further inward, the request is ignored, and processing moves to Step S4. On the other hand, if it is determined that rear derailleur 97*r* currently is positioned for engaging chain 95 with one of rear sprockets R1-R3, then downward fine tuning is performed in Step S21 by moving front derailleur 97*f* laterally inward by a small distance, and processing continues in Step S4.

While the above is a description of various embodiments of inventive features, further modifications may be employed without departing from the spirit and scope of the present invention. For example, while two front sprockets F1 and F2 were used in the above embodiments, three front sprockets (e.g., F1-F3) also may be used. In this case, any fine tuning operation requested when chain 95 engages the middle sprocket F2 may be ignored. While a road bicycle was described, the teachings herein may be applied to any type of derailleur operated bicycle. While a manually operated, electrically controlled derailleur was described, the teachings herein also could be applied to electrically controlled derailleurs that operate automatically based on bicycle speed or some other criteria.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A derailleur control apparatus comprising:
   a control unit that receives shift control signals;
   wherein the control unit provides an electrically-derived first signal to operate the derailleur a first distance from a first sprocket to a second sprocket in response to an electrically-derived first shift control signal received while operating in a riding mode, the riding mode being a state when the bicycle is being ridden; and
   wherein the control unit provides an electrically-derived second signal to operate the derailleur a second distance less than the first distance in response to an electrically-derived second shift control signal received while operating in the riding mode.

2. The apparatus according to claim 1 wherein the first shift control signal is received for a first time interval, wherein the second shift control signal is received for a second time interval, and wherein the first time interval is different from the second time interval to distinguish between whether the derailleur is to be moved the first distance or the second distance.

3. The apparatus according to claim 2 wherein the second time interval is greater than the first time interval.

4. The apparatus according to claim 2 wherein the second distance is based on a length of the second time interval.

5. The apparatus according to claim 4 wherein the second distance is proportional to a length of the second time interval.

6. The apparatus according to claim 4 wherein the second distance is based on a length of the first time interval.

7. The apparatus according to claim 6 wherein the second distance is based on a difference between a length of the first time interval and a length of the second time interval.

8. The apparatus according to claim 4 wherein the second distance comprises:
   a predetermined initial distance; and
   a further distance based on the second time interval.

9. The apparatus according to claim 1 wherein the first signal and the second signal both are adapted to operate a front derailleur.

10. The apparatus according to claim 1 wherein the control unit receives an inhibit signal that inhibits the provision of the second signal when the control unit receives the second shift control signal.

11. The apparatus according to claim 10 wherein the inhibit signal comprises a gear position signal.

12. The apparatus according to claim 11 wherein the inhibit signal comprises a rear derailleur gear position signal.

13. The apparatus according to claim 10 wherein the inhibit signal comprises a power supply signal.

14. The apparatus according to claim 13 wherein the power supply signal comprises a power supply voltage signal.

15. The apparatus according to claim 1 wherein the first distance is in a first direction, wherein the second distance is in a second direction, and wherein the first direction is the same as the second direction.

16. The apparatus according to claim 1 wherein the first distance is in a first direction, wherein the second distance is in a second direction, and wherein the first direction is opposite the second direction.

17. The apparatus according to claim 1 wherein the control unit receives a direction control signal, and wherein the second distance is in a direction determined by the direction control signal.

18. The apparatus according to claim 17 wherein the direction control signal comprises a gear position signal.

19. The apparatus according to claim 18 wherein the direction control signal comprises a front derailleur gear position signal.

20. The apparatus according to claim 1 wherein the first shift control signal and the second shift control signal both comprise a transmission upshift signal.

21. The apparatus according to claim 1 wherein the first shift control signal and the second shift control signal both comprise a transmission downshift signal.

22. The apparatus according to claim 1 wherein the second shift control signal comprises a plurality of signals received in a selected time interval.

23. The apparatus according to claim 1 wherein the first shift control signal and the second shift control signal are received from a same shift control device.

24. The apparatus according to claim 1 wherein the first shift control signal and the second shift control signal are received from different shift control devices.

25. The apparatus according to claim 1 wherein the second distance is predetermined.

26. The apparatus according to claim 1 further comprising a shift control device that provides the shift control signals to the control unit.

27. The apparatus according to claim 26 wherein the shift control device includes a shift control switch that moves to a first position to provide the first shift control signal and that moves to a second position to provide the second shift control signal.

28. The apparatus according to claim 27 wherein the first position is the same as the second position.

29. The apparatus according to claim 27 wherein the first position is different from the second position.

30. The apparatus according to claim 29 wherein the shift control switch moves from a home position to the first position and from the home position to the second position.

31. The apparatus according to claim 30 wherein the first position and the second position are in a same direction from the home position.

32. The apparatus according to claim 30 wherein the first position and the second position are in different directions from the home position.

33. The apparatus according to claim 27 wherein the shift control switch moves from a home position to an upshift position in a first direction, and wherein the shift control switch moves from the home position to a downshift position in a second direction opposite the first direction.

34. The apparatus according to claim 33 wherein the first position is the same as one of the upshift position and the downshift position.

35. The apparatus according to claim 34 wherein the second position is in a same direction from the home position as the first position.

36. The apparatus according to claim 35 wherein the second position is the same as the first position.

37. The apparatus according to claim 35 wherein the second position is further from the home position than the first position.

38. The apparatus according to claim 26 wherein the shift control device comprises:
- a first shift control switch that provides the first shift control signal; and
- a second shift control switch that provides the second shift control signal.

39. The apparatus according to claim 38 wherein the first shift control switch and the second shift control switch are mounted to a same housing.

40. The apparatus according to claim 39 wherein a single switch member operates both the first switch and the second switch.

41. The apparatus according to claim 38 wherein the first switch is mounted to a first housing, and wherein the second switch is mounted to a different second housing.

42. The apparatus according to claim 1 wherein the first distance is a distance sufficient to shift a chain from engagement with the first sprocket to engagement with the second sprocket.

43. The apparatus according to claim 42 wherein the second signal operates the derailleur to move in a direction away from a sprocket with which the chain is engaged without disengaging the chain from the sprocket.

44. A method of operating a bicycle derailleur comprising the steps of:
- providing an electrically-derived first signal by a control unit to operate the derailleur a first distance from a first sprocket to a second sprocket in response to receiving an electrically-derived first shift control signal while operating in a riding mode, the riding mode being a state when the bicycle is being ridden; and
- providing an electrically-derived second signal by the control unit to operate the derailleur a second distance less than the first distance in response to receiving an electrically-derived different second shift control signal while operating in the riding mode.

* * * * *